United States Patent
Endoh et al.

(10) Patent No.: US 10,891,516 B2
(45) Date of Patent: Jan. 12, 2021

(54) NON-TRANSITORY COMPUTER-READABLE RECORDING MEDIUM, LEARNING METHOD, AND LEARNING APPARATUS

(71) Applicant: FUJITSU LIMITED, Kawasaki (JP)

(72) Inventors: Toshio Endoh, Yokohama (JP); Kento Uemura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 16/287,685

(22) Filed: Feb. 27, 2019

(65) Prior Publication Data

US 2019/0286939 A1    Sep. 19, 2019

(30) Foreign Application Priority Data

Mar. 13, 2018  (JP) ................. 2018-045890

(51) Int. Cl.
*G06K 9/62* (2006.01)
*G06K 9/46* (2006.01)

(52) U.S. Cl.
CPC ............. *G06K 9/6256* (2013.01); *G06K 9/46* (2013.01)

(58) Field of Classification Search
CPC ............ G06N 3/08; G06N 3/084; G06K 9/46; G06K 9/62; G06K 9/6217; G06K 9/6227; G06K 9/6228; G06K 9/6253; G06K 9/6254; G06K 9/6255; G06K 9/626; G06K 9/6261; G06K 9/6262; G06K 9/6263; G06K 9/6264; G06K 9/6256
USPC .................................................. 382/156–158
See application file for complete search history.

(56) References Cited

U.S. PATENT DOCUMENTS

| | | | |
|---|---|---|---|
| 9,443,320 B1 | 9/2016 | Gaidon et al. | |
| 10,664,722 B1* | 5/2020 | Sharma | G06Q 30/0641 |
| 2016/0148077 A1* | 5/2016 | Cox | G06K 9/6263 |
| | | | 382/159 |
| 2016/0321540 A1* | 11/2016 | Towal | G06K 9/4628 |

FOREIGN PATENT DOCUMENTS

| | | |
|---|---|---|
| JP | 2011-8634 | 1/2011 |
| JP | 2015-176175 | 10/2015 |
| JP | 2016-219004 | 12/2016 |

OTHER PUBLICATIONS

Krizhevsky, Alex, Ilya Sutskever, and Geoffrey E. Hinton. "Imagenet classification with deep convolutional neural networks." Advances in neural information processing systems. 2012. (Year: 2012).*

(Continued)

*Primary Examiner* — Geoffrey E Summers
(74) *Attorney, Agent, or Firm* — Staas & Halsey LLP

(57) ABSTRACT

A learning apparatus causes a first supervised learning model, which receives feature data generated from input data having data items with which a first label and a second label are associated and outputs a first estimation result, to learn such that the first estimation result is close to the first label. The learning apparatus causes a second supervised learning model, which receives the feature data and outputs a second estimation result, to learn such that the second estimation result is close to the second label. The learning apparatus causes a feature extractor, which generates the feature data from the input data, to learn so as to facilitate recognition of the first label and suppress recognition of the second label.

5 Claims, 14 Drawing Sheets

(56) References Cited

OTHER PUBLICATIONS

Oquab, Maxime, et al. "Learning and Transferring Mid-level Image Representations Using Convolutional Neural Networks." 2014 IEEE Conference on Computer Vision and Pattern Recognition. IEEE, 2014. (Year: 2014).*

* cited by examiner

FIG.3

| NUMBER OF ATTRIBUTES | ATTRIBUTE OF INTEREST | DISTURBANCE ATTRIBUTE |
|---|---|---|
| 1, 1 | TYPE OF VEHICLE | MANUFACTURER NAME |

| DATA ID | ATTRIBUTE-OF-INTEREST LABEL | DISTURBANCE-ATTRIBUTE LABEL | DATA MAIN BODY |
|---|---|---|---|
| TR1 | CAR | COMPANY T | I1 |
| TR2 | CAR | COMPANY H | I2 |
| TR3 | TRUCK | COMPANY T | I3 |
| TR4 | TRUCK | COMPANY H | I4 |

FIG.4

| FEATURE TRAINED WEIGHT | ATTRIBUTE-OF-INTEREST TRAINED WEIGHT |
|---|---|
| W1N | W2N |

FIG.5

| FEATURE TRAINED WEIGHT | ATTRIBUTE-OF-INTEREST TRAINED WEIGHT | DISTURBANCE-ATTRIBUTE TRAINED WEIGHT |
|---|---|---|
| W10 | W20 | W30 |
| W10 | W21 | W30 |
| W10 | W21 | W31 |
| W11 | W21 | W31 |
| W11 | W22 | W31 |
| W11 | W22 | W32 |
| W12 | W22 | W32 |
| ⋮ | ⋮ | ⋮ |
| W1N | W2N | W3N |

FIG.6

| DATA ID | DATA MAIN BODY |
|---|---|
| TT1 | I1' |
| TT2 | I2' |

FIG.7

| DATA ID | EXTRACTION RESULT |
|---|---|
| TT1 | Ex1 |
| TT2 | Ex2 |

FIG.8

| DATA ID | ATTRIBUTE-OF-INTEREST LABEL |
|---|---|
| TT1 | CAR |
| TT2 | TRUCK |

| NUMBER OF ATTRIBUTES | ATTRIBUTE OF INTEREST | DISTURBANCE ATTRIBUTE | |
|---|---|---|---|
| 1,1 | WHETHER ADULT OR NOT | SEX | |
| DATA ID | ATTRIBUTE-OF-INTEREST LABEL | DISTURBANCE-ATTRIBUTE LABEL | DATA MAIN BODY |
| TR1 | ADULT | MAN | I1 |
| TR2 | ADULT | WOMAN | I2 |
| TR3 | CHILD | MAN | I3 |
| TR4 | CHILD | WOMAN | I4 |

FIG.14
| FEATURE TRAINED WEIGHT | ATTRIBUTE-OF-INTEREST TRAINED WEIGHT | DISTURBANCE-ATTRIBUTE TRAINED WEIGHT |
|---|---|---|
| W10 | W20 | W30 |
| FEATURE TRAINED WEIGHT | ATTRIBUTE-OF-INTEREST TRAINED WEIGHT | DISTURBANCE-ATTRIBUTE TRAINED WEIGHT |
|---|---|---|
| W10 | W21 | W30 |
| W10 | W21 | W31 |
| W11 | W21 | W31 |
| W11 | W22 | W31 |
| W11 | W22 | W32 |
| W12 | W22 | W32 |
| ⋮ | ⋮ | ⋮ |
| W1N | W2N | W3N |
| FEATURE TRAINED WEIGHT | ATTRIBUTE-OF-INTEREST TRAINED WEIGHT |
|---|---|
| W1N | W2N |

FIG.17

■TRAINING DATA EXAMPLE

| NUMBER OF ATTRIBUTES | ATTRIBUTE |
|---|---|
| 1 | SEX |

| DATA ID | ATTRIBUTE-OF-INTEREST LABEL | DATA MAIN BODY |
|---|---|---|
| TR1 | MAN | I1 |
| TR2 | WOMAN | I2 |

■CHANGES IN WEIGHT DURING TRAINING PROCESS

| ATTRIBUTE TRAINED WEIGHT |
|---|
| W10 |
| W11 |
| W12 |
| W13 |
| W14 |
| W15 |
| W16 |
| ⋮ |
| ⋮ |

WEIGHT DOES NOT CONVERGE ←------

NON-TRANSITORY COMPUTER-READABLE RECORDING MEDIUM, LEARNING METHOD, AND LEARNING APPARATUS

CROSS-REFERENCE TO RELATED APPLICATION

This application is based upon and claims the benefit of priority of the prior Japanese Patent Application No. 2018-045890, filed on Mar. 13, 2018, the entire contents of which are incorporated herein by reference.

FIELD

The embodiments discussed herein are related to a non-transitory computer-readable recording medium, a learning method, and a learning apparatus.

BACKGROUND

Typically, for classification and regression by machine learning, training is conducted by using prepared training data and the target test data is estimated. For example, feature data is extracted from training data including the pair of image data on a photograph, or the like, illustrating a vehicle and the type of vehicle appearing in the image data, training is conducted, and by using a learning result, a new photograph is recognized. In recent years, deep learning (DL) has been known, which automatically designs feature data used for recognition.

Patent Literature 1: Japanese Laid-open Patent Publication No. 2016-219004
Patent Literature 2: Japanese Laid-open Patent Publication No. 2015-176175
Patent Literature 3: Japanese Laid-open Patent Publication No. 2011-8634

However, during the above-described deep learning, automatic feature design sometimes causes a reduction in generalization capability, which is recognition accuracy, with regard to data other than training data. Specifically, training data is typically given with multiple labels of attributes and, for deep learning, as it is difficult to designate a label that is not allowed to have effects on learning, learning is sometimes conducted with the feature that contributes to a label that is not allowed to have effects on learning. When test data is applied to such a learning result, recognition using the feature that contributes to the label targeted for learning is not executed; thus, a reduction in generalization capability is caused.

For example, during training using training data in which the type of vehicle (car or truck) and the manufacturer name (the company T or the company H) are attached as labels for the photograph of the vehicle, training is sometimes conducted with not the type of vehicle, which is the target label for learning, but the manufacturer name. In this case, although the recognition accuracy needs to be improved with the outer shape of the vehicle, or the like, learning is conducted for the recognition accuracy depending on the position of the emblem of the manufacturer. Therefore, when test data is the photograph of a vehicle without emblem, recognition using this learning result does not obtain a proper recognition result.

SUMMARY

According to an aspect of an embodiment, a non-transitory computer-readable recording medium stores therein a program that causes a computer to execute a process. The process includes causing a first supervised learning model, which receives feature data generated from input data having data items with which a first label and a second label are associated and outputs a first estimation result, to learn such that the first estimation result is close to the first label; causing a second supervised learning model, which receives the feature data and outputs a second estimation result, to learn such that the second estimation result is close to the second label; and causing a feature extractor, which generates the feature data from the input data, to learn so as to facilitate recognition of the first label and suppress recognition of the second label.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram that illustrates an example of training data stored in a training data DB;
FIG. 4 is a diagram that illustrates an example of the learning result stored in a learning-result DB;
FIG. 5 is a diagram that illustrates changes in weights during a training process;
FIG. 6 is a diagram that illustrates an example of test data stored in a test data DB;
FIG. 7 is a diagram that illustrates an example of feature extraction results during a recognition process;
FIG. 8 is a diagram that illustrates an example of recognition results;
FIG. 14 is a diagram that illustrates changes in weights during training according to the second embodiment;
FIG. 17 is a diagram that illustrates attribute training in case of misuse of the learning result.

DESCRIPTION OF EMBODIMENTS

Preferred embodiments will be explained with reference to accompanying drawings. Furthermore, the present invention is not limited to the embodiments. The embodiments may be combined as needed as long as the consistency is ensured.

[a] First Embodiment

Explanation of a Learning Apparatus

Figure 1:
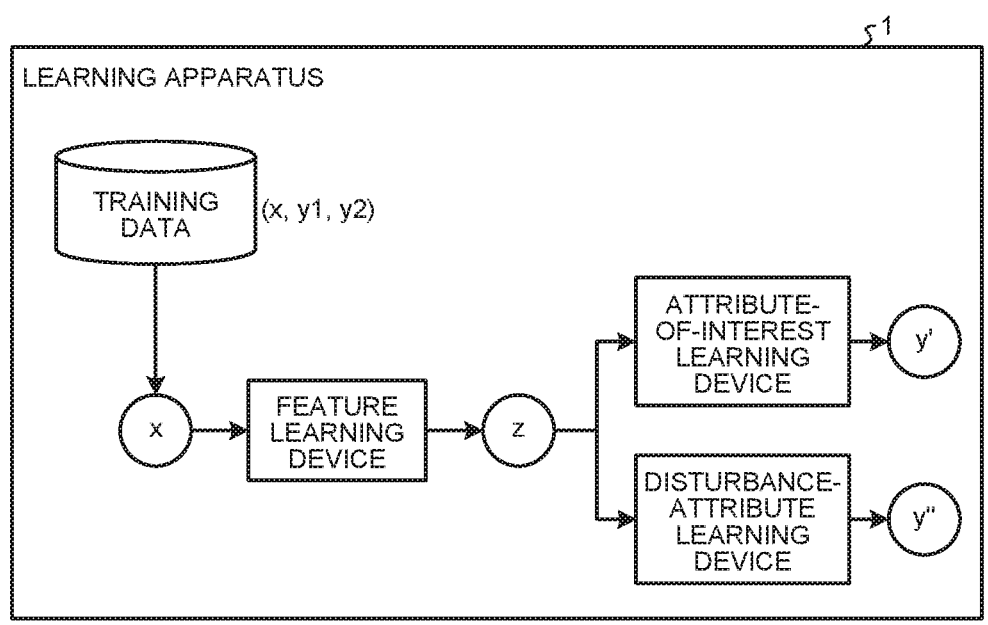
FIG. 1 is a diagram that illustrates a learning apparatus according to a first embodiment.

FIG. 1 is a diagram that illustrates a learning apparatus according to the first embodiment. A learning apparatus 1 illustrated in FIG. 1 is an example of an information processing apparatus including a feature learning device (learning model), an attribute-of-interest learning device, and a disturbance-attribute learning device, and it causes each of the learning devices to be trained by using training data. Each of the learning devices may be composed of, for example, a neural network (NN), and various learning methods, such as gradient method, may be used. Furthermore, although images are illustrated in explanation as an example for learning, it is only an example; it is also applicable to audio data, and the like, and there are no limitations on learning contents or learning targets.

The training data is a group of supervised data sets that are given with multiple attributes as labels, and it includes multiple sets of data composed of "image data, attribute-of-interest label, disturbance-attribute label". Here, the image data is the photograph of a vehicle, or the like. The attribute-of-interest label is the label of the attribute that is targeted for learning and that is allowed to have effects on a recognition result by the user, and it is an example of a suitable label. The disturbance-attribute label is the label of the attribute that is exempt from learning and that is not allowed to have effects on a recognition result by the user, and it is an example of an unsuitable label. In explanation of FIG. 1, "x, y1, y2" are used as the training data "image data, attribute-of-interest label, disturbance-attribute label". Furthermore, the user is capable of designating any of the labels included in the training data as the attribute-of-interest label.

The feature learning device is an example of a feature generator that receives image data (x) in the training data and generates feature data (z). For example, when the learning target is image data, the feature learning device generates, as a feature, an edge or contrast in the image data, the outer shape of a vehicle in the image, or the like.

The attribute-of-interest learning device is an example of a supervised learning device that executes learning such as classification or regression on supervised data with a label. For example, the attribute-of-interest learning device receives the feature data (z), which is generated from the input (x), and outputs an estimated label (y') that is a predicted value.

The disturbance-attribute learning device is an example of a supervised learning device that executes learning such as classification or regression on supervised data with a label. For example, the disturbance-attribute learning device receives the feature data (z), which is generated from the input (x), and outputs an estimated label (y") that is a predicted value.

The learning apparatus 1 causes the attribute-of-interest learning device to learn such that the estimated label (y') and the attribute-of-interest label (y1) are matched. Furthermore, the learning apparatus 1 causes the disturbance-attribute learning device to learn such that the estimated label (y") and the disturbance-attribute label (y2) are matched. Moreover, the learning apparatus 1 causes the feature learning device to learn so as to facilitate recognition of the attribute-of-interest label and suppress recognition of the disturbance-attribute label.

That is, even when the labels in the training data are given with multiple attributes, the learning apparatus 1 learns to extract a feature (feature data) that does not rely on the disturbance-attribute label, thereby improving the accuracy of a recognition process with regard to the attribute-of-interest label. Thus, the learning apparatus 1 is capable of controlling feature design of the learning device with intention, thereby preventing a reduction in generalization capability.

Functional Configuration

Figure 2:
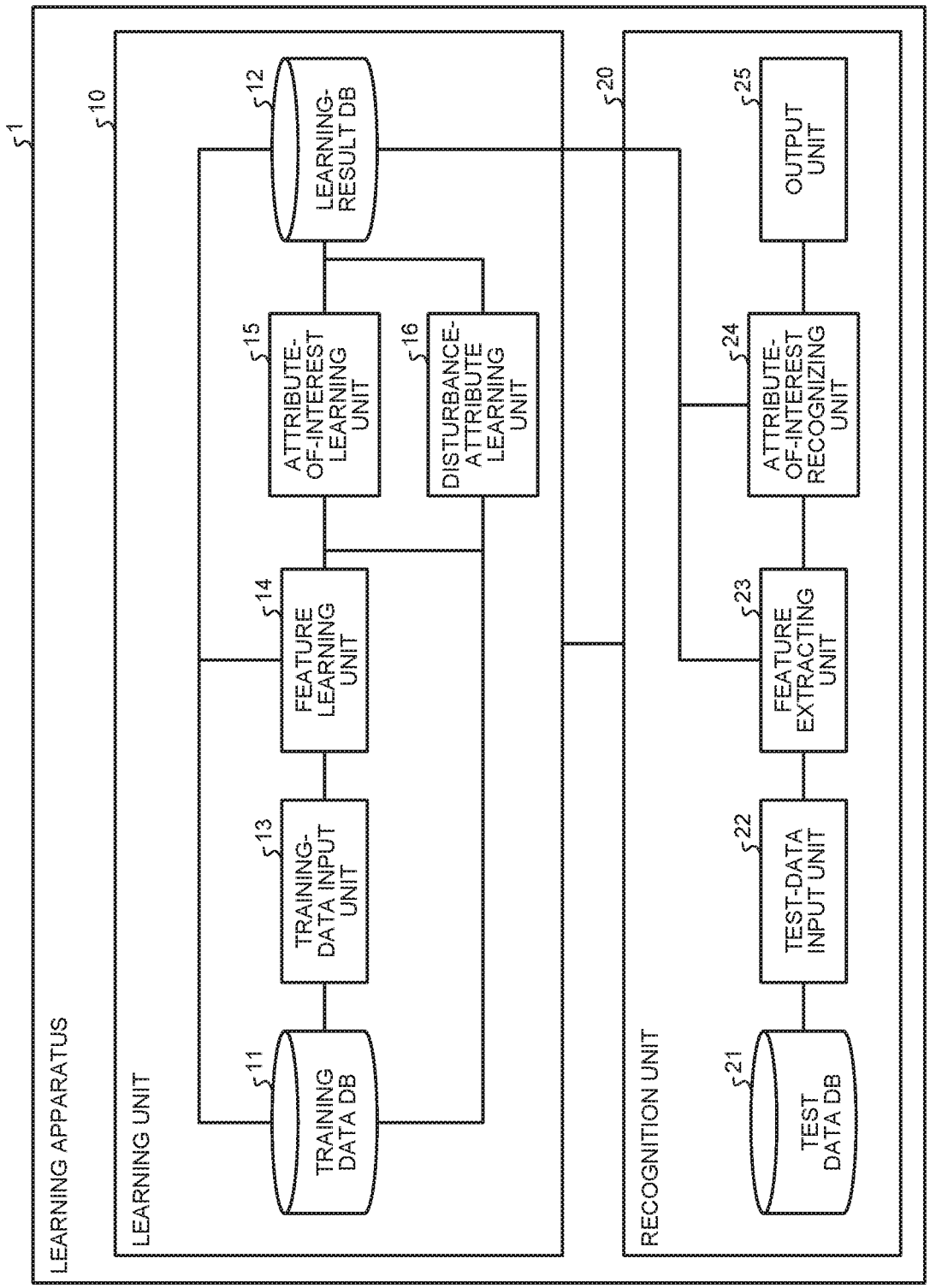
FIG. 2 is a functional block diagram that illustrates a functional configuration of the learning apparatus according to the first embodiment.

FIG. 2 is a functional block diagram that illustrates a functional configuration of the learning apparatus 1 according to the first embodiment. As illustrated in FIG. 2, the learning apparatus 1 includes a learning unit 10 and a recognition unit 20. Furthermore, each DB illustrated in FIG. 2 is stored in a storage device such as a memory or a hard disk. Moreover, various types of processing units illustrated in FIG. 2 are an example of an electronic circuit included in a processor or an example of a process executed by the processor.

Configuration of the Learning Unit

The learning unit 10 includes a training data DB 11, a learning-result DB 12, a training-data input unit 13, a feature learning unit 14, an attribute-of-interest learning unit 15, and a disturbance-attribute learning unit 16.

The training data DB 11 is a database that stores training data that is the learning target. For example, the training data DB 11 stores a group of data sets with multiple labels, which is composed of image data and multiple labels. FIG. 3 is a diagram that illustrates an example of training data stored in the training data DB 11. As illustrated in FIG. 3, the training data DB 11 stores data relating "number of attributes, attribute of interest, disturbance attribute" and data relating "data ID, attribute-of-interest label, disturbance-attribute label, data main body".

The "number of attributes" is the number of labels included in training data. The "attribute of interest" is the label of the attribute that is allowed to have effects on a recognition result by the user among the labels attached to the training data, and it may be designated by the user. The "disturbance attribute" is the label of the attribute that is not allowed to have effects on a recognition result by the user among the labels attached to the training data, and it may be designated by the user. In the example of FIG. 3, as the number of attributes is "1,1", it indicates that the number of attributes of interest is one and the number of disturbance attributes is one, and the attribute of interest "type of vehicle" and the disturbance attribute "manufacturer name" are designated.

Furthermore, "data ID" is the identifier for identifying training data. The "attribute-of-interest label" is a label designated as the attribute of interest, and the "disturbance-attribute label" is a label designated as the disturbance attribute. The "data main body" is the file name of image data, or the like. In the example of FIG. 3, the training data with the data ID "TR1" is an image file (image data) with the file name "I1", and it is given with the attribute-of-interest label "car" and the disturbance-attribute label "company T". Furthermore, image files may be also stored in a hard disk, or the like.

The learning-result DB 12 is a database that stores learning results. Specifically, the learning-result DB 12 stores the weight to a synapse in the trained neural network, or the like. FIG. 4 is a diagram that illustrates an example of the learning result stored in the learning-result DB 12. As illustrated in FIG. 4, the learning-result DB 12 stores "feature trained weight, attribute-of-interest trained weight". The "feature trained weight" is trained weight information that is set in a feature extractor, and the "attribute-of-interest trained weight" is trained weight information that is set in an attribute-of-interest recognizer.

The example of FIG. 4 indicates that "W1N" is learnt as a feature trained weight and "W2N" is learnt as an attribute-of-interest trained weight. Furthermore, the learning-result DB 12 is also capable of storing not only learning results but also a learning process during each learning.

The training-data input unit 13 is a processing unit that sequentially reads training data from the training data DB 11 and inputs it to the feature learning unit 14. For example, the training-data input unit 13 acquires the data main body "I1" from the hard disk, or the like, and inputs it to the feature learning unit 14. Furthermore, the training-data input unit 13 repeatedly inputs training data until training is finished.

The feature learning unit 14 is a processing unit that extracts feature data from training data and outputs it to the attribute-of-interest learning unit 15 and the disturbance-attribute learning unit 16, and it is a learning device that learns to extract feature data through machine learning. For example, the feature learning unit 14 uses a neural network (NN), or the like, to extract the feature data "z" from the image data "I1" input from the training-data input unit 13 and outputs it to the attribute-of-interest learning unit 15 and the disturbance-attribute learning unit 16.

Furthermore, the feature learning unit 14 learns so as to increase the accuracy with which the attribute of interest is recognized with regard to training data and decrease the accuracy with which the disturbance attribute is recognized. Specifically, the feature learning unit 14 causes the NN, which extracts feature data, to learn so as to facilitate recognition of the attribute-of-interest label and suppress recognition of the disturbance-attribute label.

For example, the feature learning unit 14 trains the weight in the NN such that there is a small error (A) between the estimated label (y') output from the attribute-of-interest learning unit 15 and the attribute-of-interest label in the training data, used to generate the estimated label (y'). Simultaneously, the feature learning unit 14 trains the weight in the NN such that there is a large error (B) between the estimated label (y") output from the disturbance-attribute learning unit 16 and the disturbance-attribute label in the training data, used to generate the estimated label (y").

More specifically, the feature learning unit 14 calculates the squared error in the least-square method as the error (A) and repeats training until the error (A) becomes less than the threshold. In the same manner, the feature learning unit 14 calculates the squared error in the least-square method as the error (B) and repeats training until the error (B) becomes more than the threshold. Furthermore, the termination condition may be not only the threshold but also a predetermined number of times. Moreover, not only the squared error but also cross entropy, or the like, may be used.

The attribute-of-interest learning unit 15 is a processing unit that outputs the estimated label of the attribute of interest from feature data, and it is a learning device that learns to estimate the estimated label of the attribute of interest through machine learning. For example, the attribute-of-interest learning unit 15 uses a neural network (NN), or the like, to estimate the estimated label (y') from the feature data "z" input from the feature learning unit 14.

Furthermore, the attribute-of-interest learning unit 15 learns so as to increase the accuracy with which the attribute of interest is recognized with regard to training data. For example, the attribute-of-interest learning unit 15 trains the weight in the NN such that there is the small error (A) between the estimated label (y'), which is estimated by using the feature data (z), and the attribute-of-interest label that corresponds to the data main body of the training data and that is used to estimate the estimated label (y'). With regard to the error (A), the squared error or the like may be used as is the case with the feature learning unit 14. Furthermore, with regard to the termination condition, the same technique as that for the feature learning unit 14 may be used.

The disturbance-attribute learning unit 16 is a processing unit that outputs the estimated label of the disturbance attribute from the feature data, and it is a learning device that learns to estimate the estimated label of the disturbance attribute through machine learning. For example, the disturbance-attribute learning unit 16 uses a neural network (NN), or the like, to estimate the estimated label (y") from the feature data "z" input from the feature learning unit 14.

Furthermore, the disturbance-attribute learning unit 16 learns so as to increase the accuracy with which the disturbance attribute is recognized with regard to training data. For example, the disturbance-attribute learning unit 16 trains the weight in the NN such that there is the small error (B) between the estimated label (y") recognized by using the feature data (z) and the attribute-of-interest label that corresponds to the data main body of the training data and that is used to estimate the estimated label (y"). With regard to the error (B), the squared error or the like may be used as is the case with the feature learning unit 14. Furthermore, with regard to the termination condition, the same technique as that for the feature learning unit 14 may be used.

Then, each of the learning devices, i.e., the feature learning unit 14, the attribute-of-interest learning unit 15, and the disturbance-attribute learning unit 16, terminates learning when an evaluation criterion is satisfied due to a comparison with a threshold. At this point, the feature learning unit 14 stores the weight at the end time of learning as a feature trained weight in the learning-result DB 12, and the attribute-of-interest learning unit 15 stores the weight at the end time of learning as an attribute-of-interest trained weight in the learning-result DB 12. Furthermore, each of the learning devices may terminate learning when any of the learning devices satisfies the evaluation criterion or may terminate learning when all of the learning devices satisfy the evaluation criterion.

Here, changes in weights during a training process are explained. FIG. 5 is a diagram that illustrates changes in weights during a training process. As illustrated in FIG. 5, after training using the first training data is finished while "W10, W20, W30" are set as default values of "feature trained weight, attribute-of-interest trained weight, disturbance-attribute trained weight", the attribute-of-interest trained weight among "W10, W20, W30" is updated so that "W10, W21, W30" are set. Then, the disturbance-attribute trained weight among "W10, W21, W30" is updated so that "W10, W21, W31" are set. Further, the feature trained weight among "W10, W21, W31" is updated so that "W11, W21, W31" are set.

In this way, training is conducted by using training data as needed, and if the weights are "W1N, W2N, W3N" when the evaluation criterion is satisfied, "feature trained weight, attribute-of-interest trained weight"="W1N, W2N" are stored in the learning-result DB 12. Here, in the example explained, the trained weights for the learning devices are updated with the single training data; however, this is not a limitation, and the trained weight for the single learning device may be also updated with the single training data.

Configuration of the Recognition Unit

The recognition unit 20 includes a test data DB 21, a test-data input unit 22, a feature extracting unit 23, an attribute-of-interest recognizing unit 24, and an output unit 25.

The test data DB 21 is a database that stores the target data to be estimated. Specifically, the test data DB 21 stores image data that has no label attached thereto and has an image that is unknown. FIG. 6 is a diagram that illustrates an example of test data stored in the test data DB 21.

As illustrated in FIG. 6, the test data DB 21 stores "data ID, data main body" in a related manner. The "data ID" is the identifier for identifying test data, and the "data main body" is the file name of image data, or the like. The example of FIG. 6 indicates that the test data with the data ID "TT1" is the image file with the file name "I1'", and the test data with the data ID "TT2" is the image file with the file name "I2'". Furthermore, image files may be also stored in the hard disk, or the like.

The test-data input unit 22 is a processing unit that sequentially reads test data from the test data DB 21 and inputs it to the feature extracting unit 23. For example, the test-data input unit 22 acquires the data main body "I1'" from the hard disk, or the like, inputs it to the feature extracting unit 23, and after recognition of the data main body "I1'" is finished, acquires the data main body "I2'" from the hard disk, or the like, and inputs it to the feature extracting unit 23.

The feature extracting unit 23 is a processing unit that executes the feature extractor that uses the NN using the weight that is trained with regard to extraction of feature data so as to extract feature data from test data. Specifically, the feature extracting unit 23 reads "feature trained weight (W1N)" from the learning-result DB 12 and forms the NN in which "feature trained weight (W1N)" is set as the weight to a synapse. Then, the feature extracting unit 23 extracts feature data in accordance with the trained weight to the synapse.

FIG. 7 is a diagram that illustrates an example of feature extraction results during a recognition process. As illustrated in FIG. 7, when the data main body "I1'" with the data ID "TT1" is input, the feature extracting unit 23 extracts feature data "Ex1" and outputs it to the attribute-of-interest recognizing unit 24. Furthermore, when the data main body "I2'" with the data ID "TT2" is input, the feature extracting unit 23 extracts feature data "Ex2" and outputs it to the attribute-of-interest recognizing unit 24.

The attribute-of-interest recognizing unit 24 is a processing unit that executes the attribute-of-interest recognizer that uses the NN using the weight that is trained with regard to estimation of the attribute-of-interest label and recognizes the label from the feature (feature data) of test data. Specifically, the attribute-of-interest recognizing unit 24 reads "the attribute-of-interest trained weight (W2N)" from the learning-result DB 12 and forms the NN in which "the attribute-of-interest trained weight (W2N)" is set as the weight to a synapse. Then, the attribute-of-interest recognizing unit 24 recognizes the label in accordance with the trained weight to a synapse.

FIG. 8 is a diagram that illustrates an example of recognition results. As illustrated in FIG. 8, when the feature data "Ex1" of the data main body "I1'" with the data ID "TT1" is input, the attribute-of-interest recognizing unit 24 recognizes the attribute-of-interest label "car" and outputs it to the output unit 25. Furthermore, when the feature data "Ex2" of the data main body "I2'" with the data ID "TT2" is input, the attribute-of-interest recognizing unit 24 recognizes the attribute-of-interest label "truck" and outputs it to the output unit 25.

The output unit 25 is a processing unit that causes a display unit, such as a display, to present a recognition result of the attribute-of-interest recognizing unit 24 or transmits it to a user terminal. For example, the output unit 25 outputs "car" as a recognition result of the data main body "I1'" with the data ID "TT1" and outputs "truck" as a recognition result of the data main body "I2'" with the data ID "TT2".

Flow of a Learning Process

Figure 9:
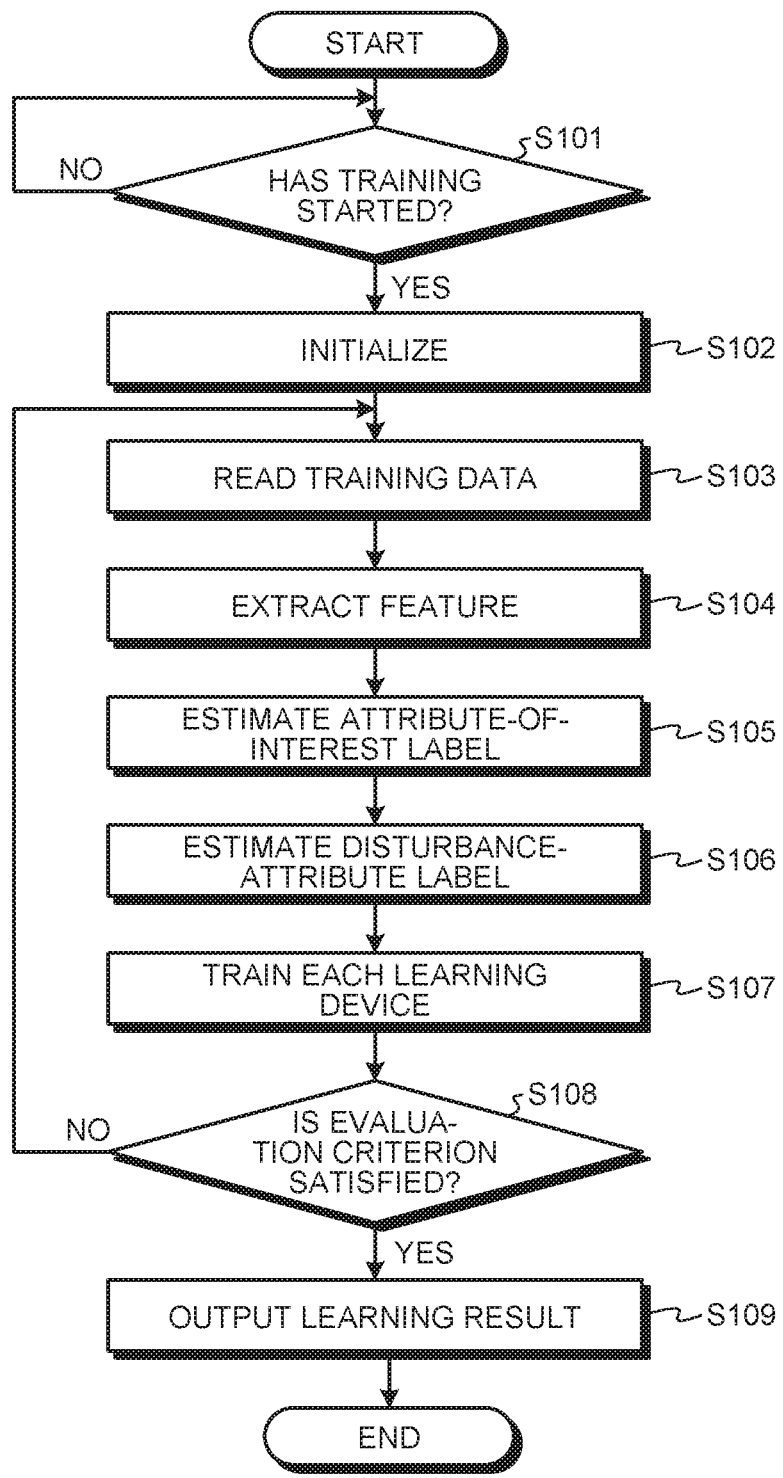
FIG. 9 is a flowchart that illustrates the flow of a learning process.

FIG. 9 is a flowchart that illustrates the flow of a learning process. As illustrated in FIG. 9, after a command is received and training is started (S101: Yes), the learning unit 10 sets a random value as the weight to a synapse in each learning device, thereby initializing each learning device (S102).

Then, the learning unit 10 reads training data (S103) and uses the feature learning unit 14 to extract feature data (S104). Then, the learning unit 10 uses the attribute-of-interest learning unit 15 to estimate the attribute-of-interest label from the feature data (S105) and uses the disturbance-attribute learning unit 16 to estimate the disturbance-attribute label from the feature data (S106).

Then, the learning unit 10 trains each learning device (S107). Specifically, the feature learning unit 14 in the learning unit 10 trains the weight in the NN such that there is the small error (A) between the estimated label (y') output from the attribute-of-interest learning unit 15 and the attribute-of-interest label in the training data. Simultaneously, the feature learning unit 14 trains the weight in the NN such that there is the large error (B) between the estimated label (y") output from the disturbance-attribute learning unit 16 and the disturbance-attribute label in the training data. Furthermore, the attribute-of-interest learning unit 15 trains the weight in the NN such that the above-described error (A) becomes small, and the disturbance-attribute learning unit 16 trains the weight in the NN such that the above-described error (B) becomes small.

Then, when the evaluation criterion is satisfied (S108: Yes), the learning unit 10 outputs the learning result to the learning-result DB 12 (S109). Conversely, when the evaluation criterion is not satisfied (S108: No), the learning unit 10 repeats S103 and subsequent steps.

Flow of the Recognition Process

Figure 10:
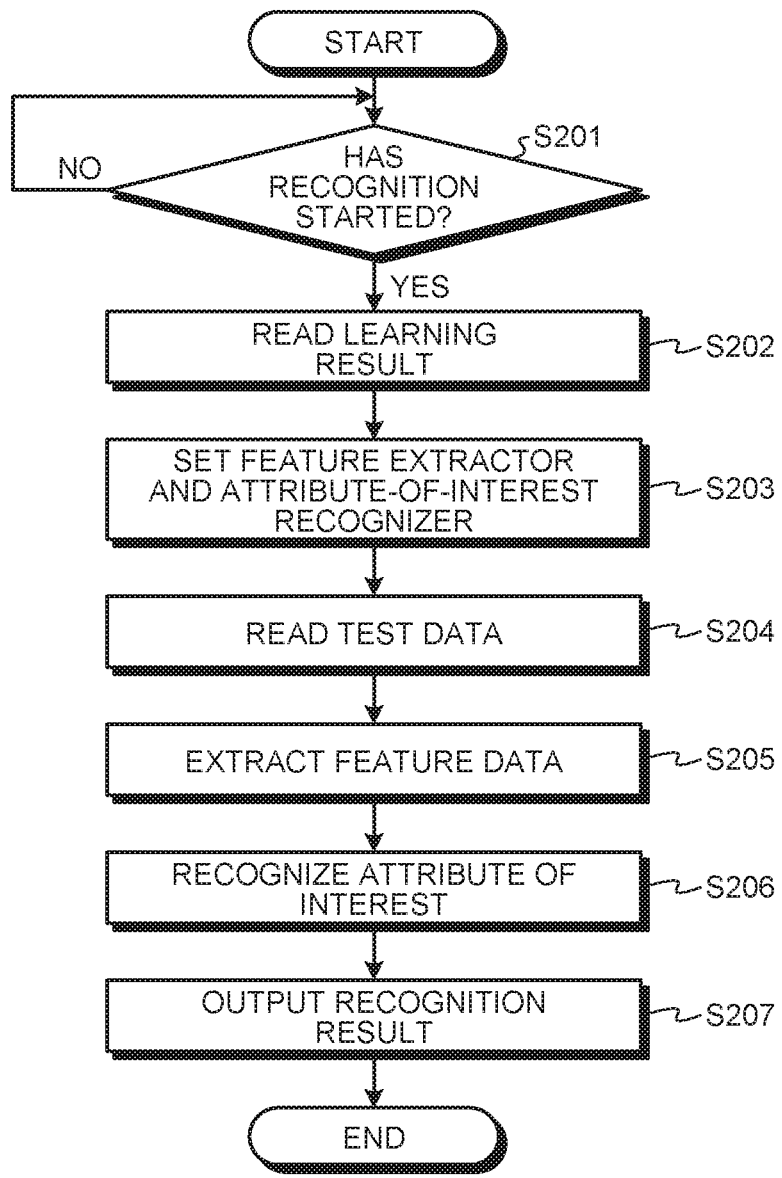
FIG. 10 is a flowchart that illustrates the flow of a recognition process.

FIG. 10 is a flowchart that illustrates the flow of the recognition process. As illustrated in FIG. 10, after a command is received and recognition is started (S201: Yes), the recognition unit 20 reads a learning result from the learning-result DB 12 (S202).

Then, the recognition unit 20 sets the feature extractor and the attribute-of-interest recognizer in which each weight, which is a learning result, is set to a synapse (S203) and reads test data (S204).

Then, the recognition unit 20 uses the feature extracting unit 23, which executes the feature extractor, to extract feature data from the test data (S205) and uses the attribute-of-interest recognizing unit 24, which executes the attribute-of-interest recognizer, to recognize the attribute of interest from the feature data (S206). Then, the recognition unit 20 uses the output unit 25 to output a recognition result (S207).

Comparative Example of Recognition Results and Advantage

Figure 11:
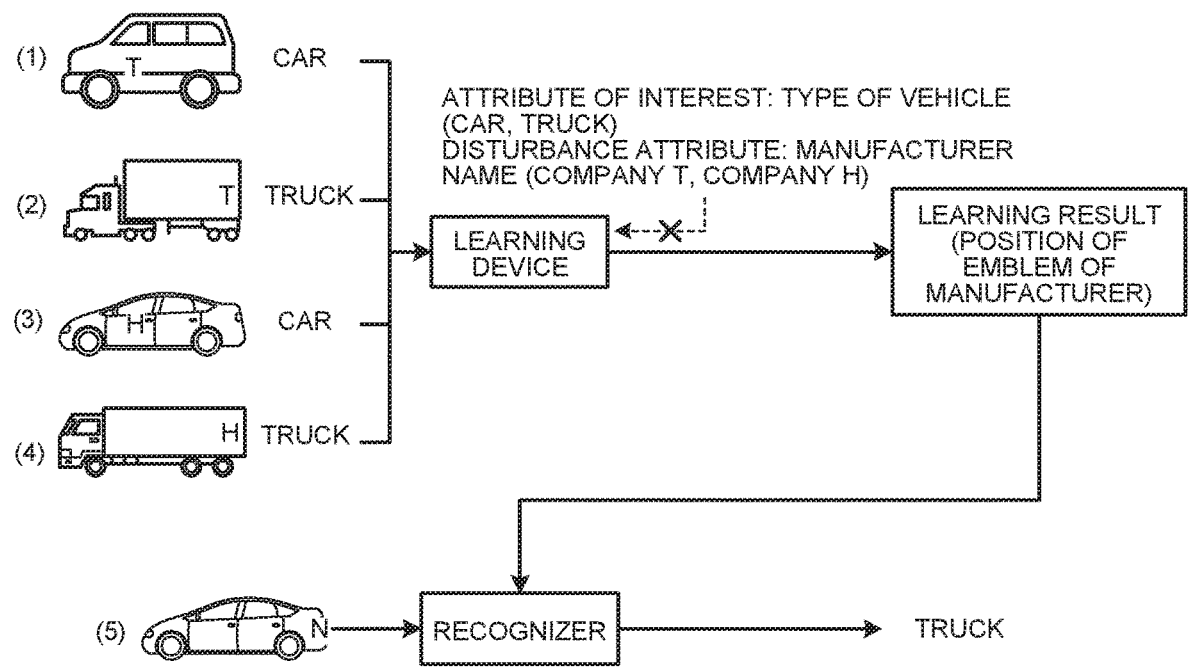
FIG. 11 is a diagram that illustrates the conventional recognition result.
Figures 12, 13:
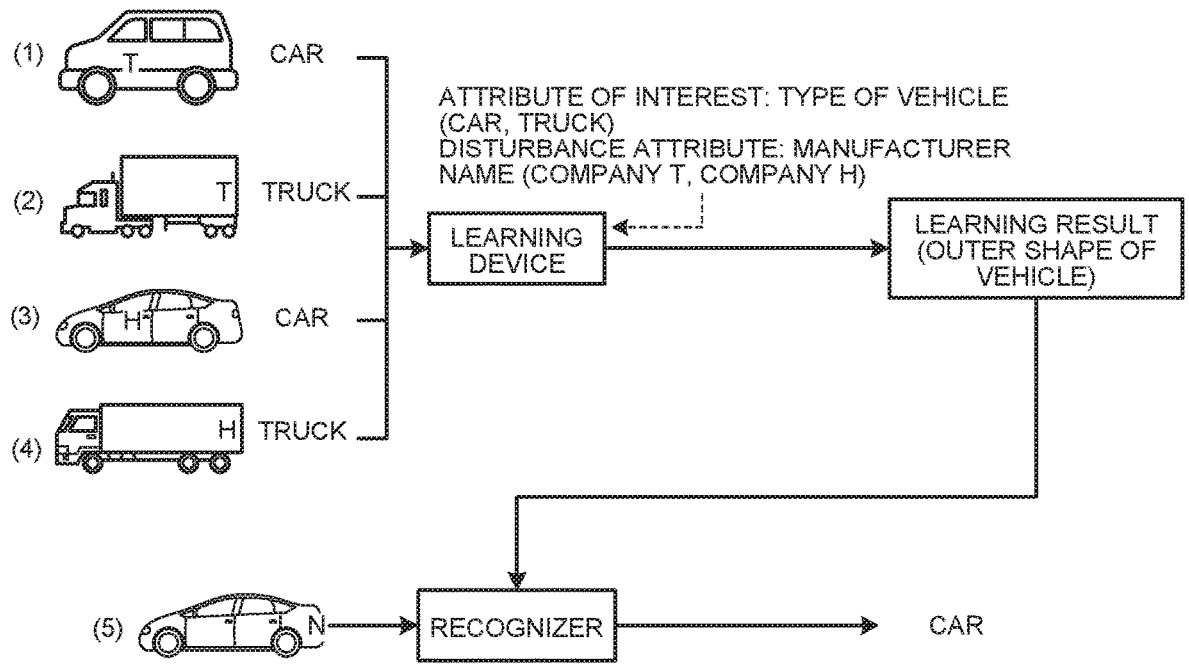
FIG. 12 is a diagram that illustrates a recognition result according to the first embodiment.
FIG. 13 is a diagram that illustrates training data according to a second embodiment.

Next, an explanation is given of a comparative example between a conventional learning result and a learning result according to the first embodiment. FIG. 11 is a diagram that illustrates the conventional recognition result, and FIG. 12 is a diagram that illustrates a recognition result according to the first embodiment.

Here, as training data "image, type of vehicle (label), manufacturer name (label)", (1) "the image of the car with the emblem of the company T attached on the front side, the car, the company T", (2) "the image of the truck with the emblem of the company T attached on the rear side, the truck, the company T", (3) "the image of the car with the emblem of the company H attached on the front side, the car, the company H", and (4) "the image of the truck with the emblem of the company H attached on the rear side, the truck, the company H". Furthermore, the user designates the type of vehicle as the attribute of interest and the manufacturer name as the disturbance attribute.

For the conventional training illustrated in FIG. 11, it is difficult to designate the attribute of interest or the disturbance attribute for a learning device, such as a feature learning device. For this reason, the learning device is sometimes trained to discriminate between a car and a truck in accordance with the position of the emblem of its manufacturer. For example, the learning device is trained to recognize a car in the training data (1) and (3) as the emblem is attached on the front side, and it is trained to recognize a truck in the training data (2) and (4) as the emblem is attached on the rear side.

Therefore, when (5) "the image of the car with the emblem of the company N attached on the rear side" is input as test data, the recognizer using the learning result improperly recognizes "truck" as the emblem is attached on the rear side.

Conversely, as illustrated in FIG. 12, the learning apparatus 1 according to the first embodiment enables designation of the attribute of interest or the disturbance attribute for the learning device such as the feature learning device. Thus, the learning device in the learning apparatus 1 may be trained to recognize a car and a truck based on not the manufacturer name that is the disturbance attribute but the outer shape of the car. For example, the learning device in the learning apparatus 1 is trained to recognize a car in the training data (1) and (3) as the rear side of the car is not horizontal (a bed) regardless of the position of the emblem, and it is trained to recognize a truck in the training data (2) and (4) as the rear side of the car is horizontal (a bed) regardless of the position of the emblem.

Therefore, when (5) "the image of the car with the emblem of the company N attached on the rear side" is input as test data, the recognizer using the learning result may recognize "car" as the rear side of the car is not horizontal (a bed) regardless of the position of the emblem.

Thus, the learning apparatus 1 enables training by explicitly designating the desirable attribute label for learning for the learning device even when there is an attribute label that is not allowed to have effects on a recognition result or when there is an attribute label that is not allowed to be included for learning, whereby a reduction in generalization capability may be prevented.

[b] Second Embodiment

In the example explained according to the first embodiment, the vehicle appearing in the image (photograph) of the vehicle is recognized as a car or a truck; however, this is not a limitation, and other various types of image recognition are applicable. Therefore, in the example explained according to a second embodiment, the image (photograph) of a person is recognized as an adult or a child.

FIG. 13 is a diagram that illustrates training data according to the second embodiment. Here, the data structure is the same as that in the first embodiment. As illustrated in FIG. 13, according to the second embodiment, "whether an adult or not" is designated as the attribute of interest and "sex" as the disturbance attribute.

Therefore, the attribute-of-interest learning unit 15 learns the weight in the NN such that "attribute-of-interest label" and the estimated label are matched with regard to the training data illustrated in FIG. 13. The disturbance-attribute learning unit 16 learns the weight in the NN such that "disturbance-attribute label" and the estimated label are matched with regard to the training data illustrated in FIG. 13. The feature learning unit 14 learns the weight in the NN such that "attribute-of-interest label" and the estimated label by the attribute-of-interest learning unit 15 are matched and learns the weight in the NN such that "disturbance-attribute label" and the estimated label by the disturbance-attribute learning unit 16 are not matched.

FIG. 14 is a diagram that illustrates changes in weights during training according to the second embodiment. As illustrated in FIG. 14, when training using the first training data is finished while "W10, W20, W30" are set as default values of "feature trained weight, attribute-of-interest trained weight, disturbance-attribute trained weight", the attribute-of-interest trained weight among "W10, W20, W30" is updated so that "W10, W21, W30" are set. Then, the disturbance-attribute trained weight among "W10, W21, W30" is updated so that "W10, W21, W31" are set. Further, the feature trained weight among "W10, W21, W31" is updated so that "W11, W21, W31" are set. In this way, training is conducted by using training data as needed, and if the weights are "W1N, W2N, W3N" when the evaluation criterion is satisfied, "feature trained weight, attribute-of-interest trained weight"="W1N, W2N" are stored in the learning-result DB 12.

A specific example is given; the learning unit 10 is trained to recognize an adult or a child in accordance with the ratio of the head to the body in size of the person in an image even though it is the image of a person wearing an apron or the image of a person with long hair.

Figure 15:
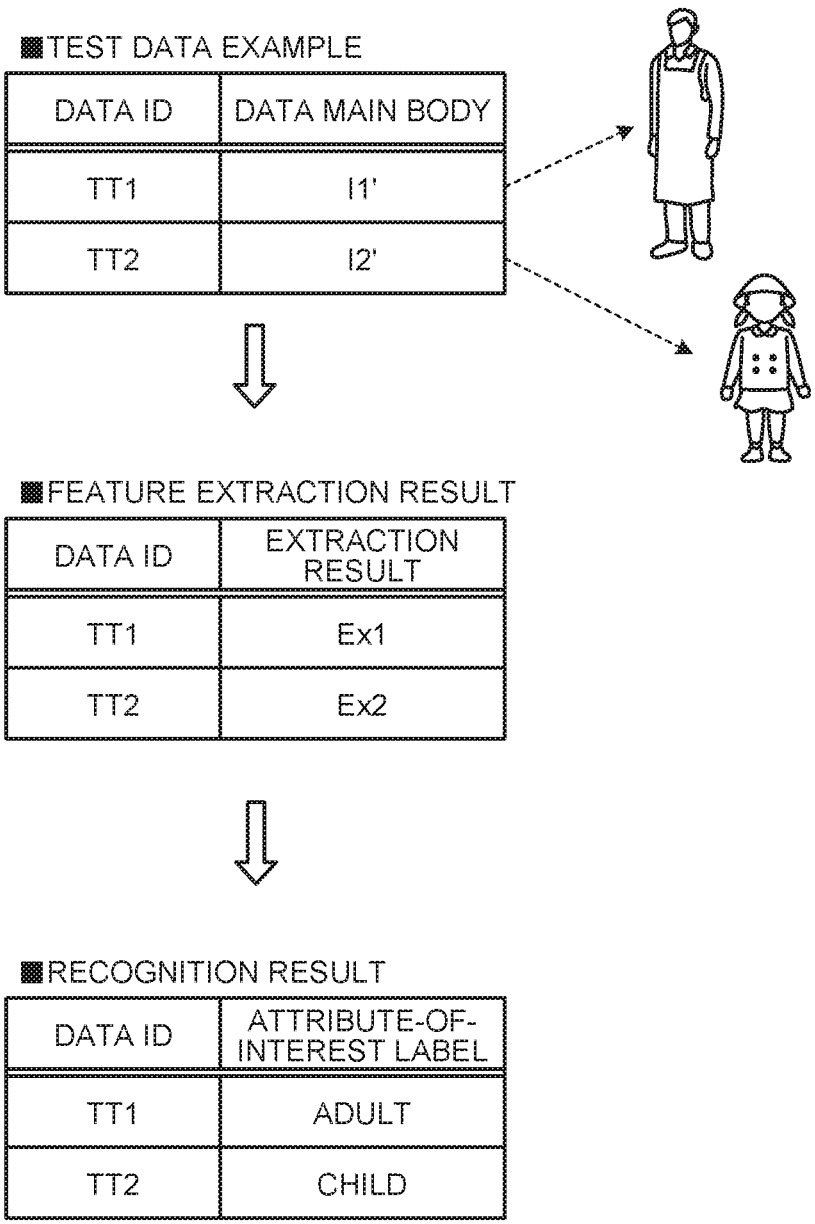
FIG. 15 is a diagram that illustrates a recognition result according to the second embodiment.

Label recognition of the recognition unit 20 using such a learning result is explained. FIG. 15 is a diagram that illustrates a recognition result according to the second embodiment. As illustrated in FIG. 15, even when the image (I1') of a man wearing an apron is input, the recognition unit 20 may extract the balance between the head and the body as the feature data (Ex1) regardless of the apron, thereby properly recognizing "adult". Similarly, even when the image (I2') of an elementary school student wearing a uniform is input, the recognition unit 20 may extract the balance between the head and the body as the feature data (Ex2) regardless of the uniform, or the like, thereby properly recognizing "child".

Thus, this kind of learning result may be used to, for example, determine a person who purchases a product such as cigarettes or alcohol which are available to only adults.

There is a possibility that the above-described learning result (weight information) for determining an adult is purchased and misused for sex determination, or the like. However, in case of misuse, the learning result according to the first and the second embodiments does not provide the recognition accuracy expected by the misuser, and accordingly misuse may be prevented.

Figure 16:
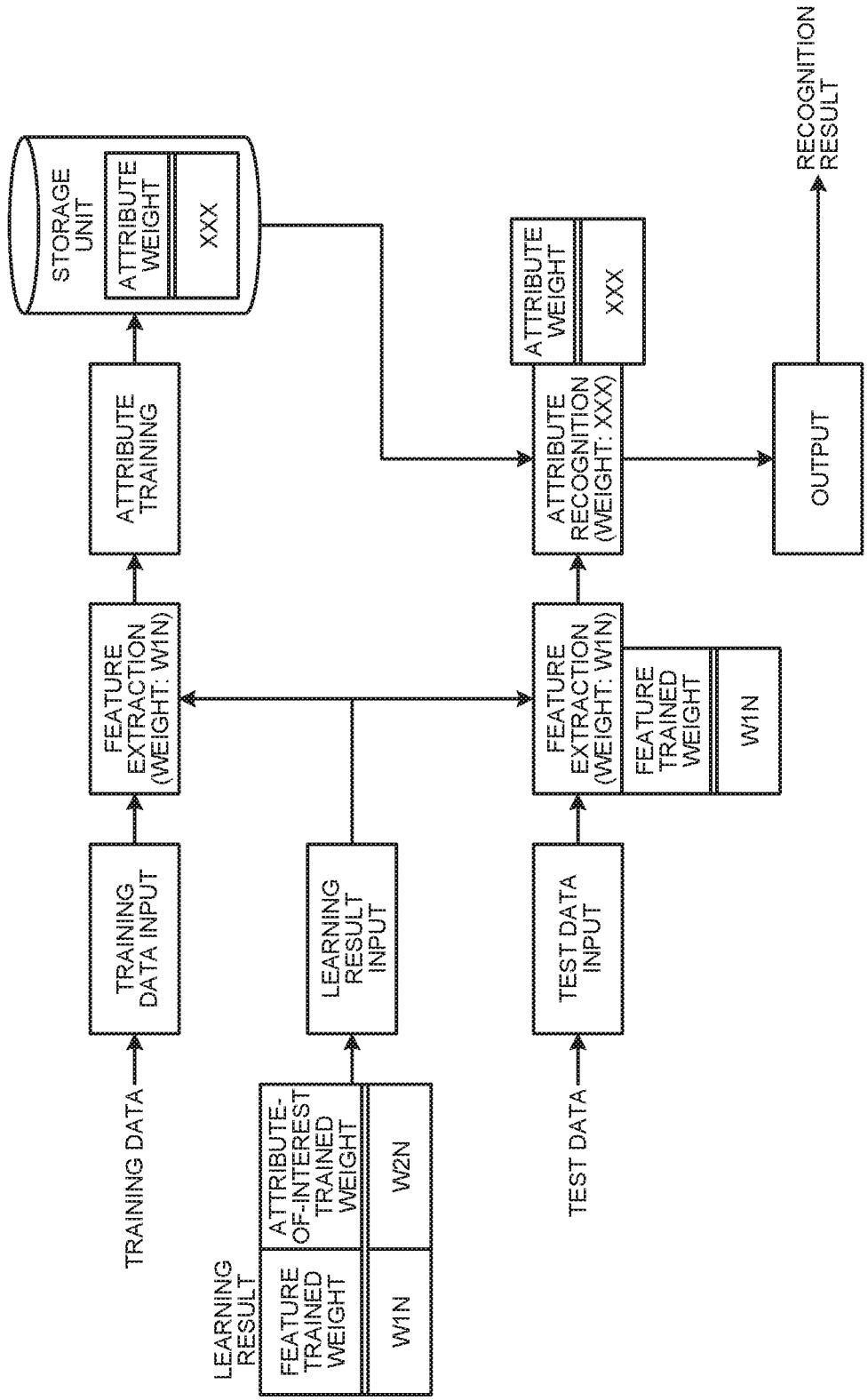
FIG. 16 is a diagram that illustrates misuse of a learning result.

FIG. 16 is a diagram that illustrates misuse of a learning result, and FIG. 17 is a diagram that illustrates attribute training in case of misuse of the learning result. As illustrated in FIG. 16, when training data input, feature extraction, and attribute training are conducted, the misuser uses the learning result for feature extraction that is the most difficult. Specifically, the misuser expects that it takes only a small amount of data as there is no feature learning and only training for the attribute (sex) is executed. Then, the misuser uses feature extraction for adult determination to acquire a learning result (attribute weight: XXX) for the attribute (sex). Then, the misuser attempts to conduct sex recognition by using the recognizer that includes feature extraction using a weight (feature weight: W1N) for feature extraction for adult determination and attribute recognition using the attribute weight (XXX).

However, as illustrated in FIG. 17, when training is conducted for the attribute (sex) by using feature extraction for adult determination, feature data (e.g., the ratio of the head to the body in size) that does not relay on the attribute label is extracted for the data "I1" with "attribute label=man" or the data "I2" with "attribute label=woman". Therefore, as illustrated in FIG. 17, the attribute trained weight is updated from the default value "W10" but does not converge. That is, the learning device used by the misuser conducts learning with the feature that is not relevant to a sex, and therefore the attribute trained weight does not satisfy the evaluation criterion. Thus, even when a learning result is misused, it is difficult to obtain the recognition accuracy expected by the misuser.

[c] Third Embodiment

Although the embodiments according to the present invention are explained above, the present invention may be implemented in various different embodiments other than the above-described embodiments. Therefore, different embodiments are explained below.

The Learning Device and the Recognizer

According to the above-described embodiment explained, the learning device and the recognizer are implemented by the single device; however, this is not a limitation, and they may be also implemented by different devices. Furthermore, the order of training by the learning device is in random order.

System

The operation procedures, control procedures, specific names, information including various types of data and parameters, and thresholds as described in the above specifications and drawings may be changed as needed except as otherwise noted. Furthermore, the attribute-of-interest learning unit 15 and the attribute-of-interest recognizing unit 24 are examples of a first supervised learning device, the disturbance-attribute learning unit 16 is an example of a second supervised learning device, and the feature learning unit 14 and the feature extracting unit 23 are examples of a feature extractor. The attribute-of-interest learning unit 15 is an example of a first learning unit, the disturbance-attribute learning unit 16 is an example of a second learning unit, and the feature learning unit 14 is an example of a third learning unit.

The components of each device illustrated are functional concepts and do not requested to be physically configured as illustrated in the drawings. Specifically, specific forms of separation and combination of each device are not limited to those depicted in the drawings. That is, a configuration may be such that all or some of them are functionally or physically separated or combined in any unit depending on various types of loads, usage, or the like. Moreover, all or any of processing functions executed by each device may be implemented by a CPU and programs analyzed and executed by the CPU or by wired logic hardware.

Hardware Configuration

Figure 18:
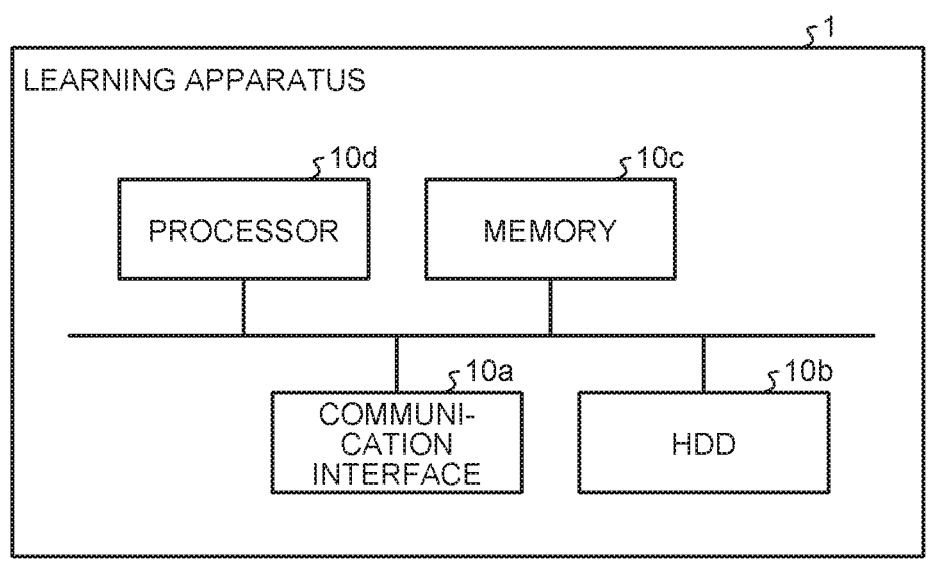
FIG. 18 is a diagram that illustrates an example of the hardware configuration.

FIG. 18 is a diagram that illustrates an example of the hardware configuration. As illustrated in FIG. 18, the learning apparatus 1 includes a communication interface 10a, an HDD (Hard Disk Drive) 10b, a memory 10c, and a processor 10d.

The communication interface 10a is a network interface card, or the like, which controls communications with other devices. The HDD 10b is an example of a storage device that stores programs, data, and the like.

Examples of the memory 10c include a RAM (Random Access Memory) such as SDRAM (Synchronous Dynamic Random Access Memory), a ROM (Read Only Memory), or a flash memory. Examples of the processor 10d include a CPU (Central Processing Unit), DSP (Digital Signal Processor), FPGA (Field Programmable Gate Array), or PLD (Programmable Logic Device).

Furthermore, the learning apparatus 1 operates as an information processing apparatus that reads and executes a program to implement a training method. Specifically, the learning apparatus 1 executes a program performing the same functions as those of the learning unit 10 and the recognition unit 20. As a result, the learning apparatus 1 may execute a process performing the same functions as those of the learning unit 10 and the recognition unit 20. Furthermore, the program in the other embodiments is not exclusively executed by the learning apparatus 1. For example, the present invention is also applicable to a case where other computers or servers execute the program or a case where they execute the program in cooperation with each other.

The program may be distributed via a network such as the Internet. Furthermore, the program may be recorded on a recording medium readable by a computer, such as a hard disk, flexible disk (FD), CD-ROM, MO (Magneto-Optical disk), or DVD (Digital Versatile Disc), and read from the recording medium by the computer to be executed.

According to the embodiments, a reduction in generalization capability may be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:

causing a first supervised learning model, which receives feature data generated from input data having data items with which a first label and a second label are associated and outputs a first estimation result, to learn such that the first estimation result is close to the first label;

causing a second supervised learning model, which receives the feature data and outputs a second estimation result, to learn such that the second estimation result is close to the second label; and causing a feature extractor, which generates the feature data from the input data, to learn so as to facilitate recognition of the first label and suppress recognition of the second label.

2. The non-transitory computer-readable recording medium according to claim 1, the process further comprising causing the feature extractor to learn such that an error between the first estimation result and the first label becomes small and an error between the second estimation result and the second label becomes large.

3. The non-transitory computer-readable recording medium according to claim 1, the process further comprising generating the feature data from target test data to be recognized by using the trained feature extractor and recognizing the first label from the feature data by using the trained first supervised learning model.

4. A learning method comprising:
causing a first supervised learning model, which receives feature data generated from input data having data items with which a first label and a second label are associated and outputs a first estimation result, to learn such that the first estimation result is close to the first label, using a processor;
causing a second supervised learning model, which receives the feature data and outputs a second estimation result, to learn such that the second estimation result is close to the second label, using the processor; and
causing a feature extractor, which generates the feature data from the input data, to learn so as to facilitate recognition of the first label and suppress recognition of the second label, using the processor.

5. A learning apparatus comprising:
a memory; and
a processor coupled to the memory and the processor configured to:
cause a first supervised learning model, which receives feature data generated from input data having data items with which a first label and an second label are associated and outputs a first estimation result, to learn such that the first estimation result is close to the first label are matched;
cause a second supervised learning model, which receives the feature data and outputs a second estimation result, to learn such that the second estimation result is close to the second label; and
cause a feature extractor, which generates the feature data from the input data, to learn so as to facilitate recognition of the first label and suppress recognition of the second label.

* * * * *